United States Patent Office 2,790,167
Patented Apr. 23, 1957

2,790,167

TRACKING SYSTEM FOR RADIO POSITION LOCATOR

Robert B. J. Brunn, Manhasset, N. Y., assignor to Hazeltine Research, Inc., Chicago, Ill., a corporation of Illinois Application May 13, 1953, Serial No. 354,747

22 Claims. (Cl. 343—7.3)

*General*

The present invention is directed to tracking systems for radio position locators which include means for transmitting periodic time-reference pulses and receiving in response thereto position-representative pulses delayed with respect to the time-reference pulses. The tracking system of the present invention is particularly useful in radio position locators such as airborne distance-measuring equipment and, hence, will be described in that environment.

One important requirement in aerial navigation is the determination of the distance between an aircraft in flight and known geographic points along the line of flight. Distance-measuring equipment has been employed in aircraft to provide a pilot with an indication of the distance between his aircraft and such points. Modern airborne equipment usually comprises a transmitter for transmitting coded pulses for interrogating selected terrestrially located responder beacons along the line of flight. Individual ones of these beacons may respond only to pulses corresponding to their particular interrogating code by transmitting coded reply pulses for use by the distance-measuring equipment on the aircraft. Desired reply pulses actuate the coding apparatus in the distance-measuring equipment and a voltage is derived which is representative of the round-trip propagation time between the aircraft and the responder beacon. It will be evident that the magnitude of this voltage changes in accordance with the relative movement between the aircraft and the beacon.

In order to utilize the coded reply pulses of a selected beacon which is being interrogated by the moving aircraft, the distance-measuring equipment is provided with a searching system which is effective to place the equipment in a state of selective response to the reply signals from a responder beacon. To accomplish searching, prior distance-measuring equipment includes a receiver having a received signal-translating channel that is normally blocked and a gated circuit therein for conditioning the channel to translate pulses which may be received within a short gating interval. Varying the time relation of the gating interval relative to the transmission of the interrogating pulses from the distance-measuring equipment is effective to achieve searching, as will be clear from a consideration of the following example. Assuming that the receiver is gated or conditioned to translate pulses within a short interval after the interrogating signal is sent out and that a reply signal is returned directly, as in the case where the aircraft is very close to the beacon, the beacon reply is accepted and a distance indication is attained. If the reply should be delayed beyond the duration of the short gating interval, thus representing a greater separation of the aircraft and the beacon, that reply is not accepted. However, delaying the gating interval relative to the transmitted interrogation may condition the receiver to accept the delay reply and allow the distance-measuring circuits to provide an indication of a greater distance from the aircraft to the beacon. When a reply has been found, the search is discontinued and a tracking system is energized to keep the reply within the gating time to facilitate an accurate determination of distance.

The tracking systems in prior distance-measuring equipments have been rather complex because of the use of a rather large number of electron tubes and other circuit components such as resistors, condensers, inductors, and transformers which have undesirably added to the cost of such equipment. These circuit components have also represented undesired volume and weight which are important considerations in airborne equipment. Furthermore, the power consumption of some of these components is significant in airborne installations which have power sources of limited capacities. More particularly, the tracking systems of distance-measuring equipment have included pairs of generators for developing pairs of tracking pulses for sweeping the gating interval over a range of times during which coded replies may be received from the interrogated beacon. Some of these generators have comprised blocking oscillators which employ pulse transformers and, accordingly, are more expensive than other forms of oscillators. Other such generators are relaxation-type oscillators which develop tracking pulses of unequal durations, and each of these generators of the pair thereof requires a gated circuit that is responsive to the reply pulses occurring in coincidence with the tracking pulses and also requires a suitable amplifier or amplifiers. As a result, the tracking circuits have included a larger number of components than is desired for many applications.

The decoding apparatus in some prior tracking systems of distance-measuring equipment have included magnetostrictive time-delay units for selecting the coded reply pulses emanating from the responder beacons. These units are fragile, space consuming, critical as to ambient temperature, and costly. It would, therefore, be desirable if the tracking systems for distance-measuring equipment included relatively simple electrical circuits capable of performing the same function of the magnetostrictive delay units.

It is an object of the invention, therefore, to provide for use in a radio position locator a new and improved tracking system which avoids one or more of the above-mentioned disadvantages of prior such systems.

It is another object of the invention to provide for use in a radio position locator a new and improved tracking system which is relatively simple in construction, inexpensive to manufacture, and yet capable of affording reliable performance.

It is a further object of the invention to provide for use in a radio position locator a new and improved tracking system which is compact, light in weight, has relatively low power requirements, and uses a small number of electron tubes and other circuit components.

It is an additional object of the invention to provide a new and improved tracking system which includes portions thereof adapted for use in the decoding apparatus of distance-measuring equipment which selects coded reply signals from interrogated responder beacons.

In accordance with a particular form of the invention, there is provided in a radio position locator, including means for transmitting periodic time-reference pulses and receiving position-representative delayed pulses, a tracking system which comprises a circuit for generating tracking pulses, and a potential-responsive device for sweeping the tracking pulses over a range of times relative to the time-reference pulses. The tracking system also includes circuit means responsive jointly to the tracking pulses and the received pulses for developing a first signal of substantially constant value and responsive jointly to the tracking pulses and aforesaid first signal for developing a second signal of a value representative of the time relation between the tracking pulses and the received pulses. The tracking system further includes a circuit responsive to the aforesaid first and second signals for deriving and applying to the potential-responsive device a potential varying with the value of the second signal.

For a better understanding of the present invention, together with other and further objects thereof, reference is had to the following description taken in connection with the accompanying drawings, and its scope will be pointed out in the appended claims.

Referring now to the drawings.

Figure 1:
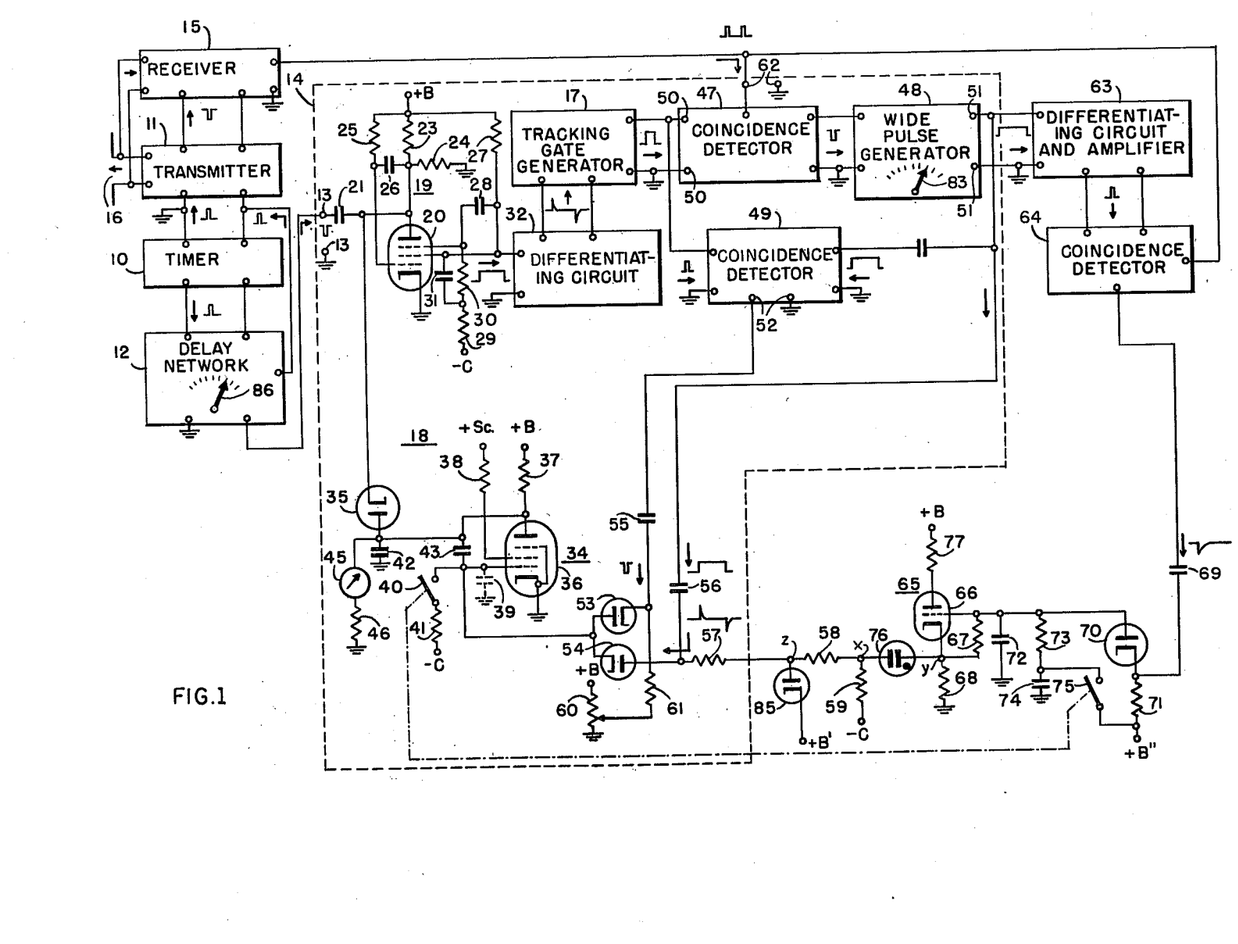
Fig. 1 is a circuit diagram, partly schematic, of a radio position locator or distance-measuring equipment including a tracking system in accordance with the present invention.

*Description of Fig. 1 distance-measuring equipment including tracking system*

Referring now more particularly to Fig. 1 of the drawings, the radio position locator or distance-measuring equipment, which will be assumed to be installed in an aircraft in flight, includes means for transmitting periodic time-reference pulses and for receiving position-representative delayed pulses from a terrestrially located responder beacon. The transmitting means includes a timer 10 coupled to a transmitter 11 for supplying periodic timing pulses thereto. A time delay network 12, which includes a suitable amplifier or polarity-reversing device and an adjustable control 86, is also coupled between the timer 10 and the transmitter 11 for supplying to the latter periodic pulses delayed with respect to the pulses from the timer. The transmitter is designed to transmit periodic time-reference pulses in the form of wave-signal pulses of predetermined duration and spacing representative of the interrogating code of the distance-measuring equipment. The time-delay network 12 is also coupled to a pair of input terminals 13, 13 of a tracking system 14, constructed in accordance with the present invention and more fully to be described hereinafter, for supplying control pulses of negative polarity to the tracking system. The distance-measuring equipment also includes a conventional receiver 15 coupled to an antenna system 16 common to the transmitter and the receiver. An output circuit of the transmitter 11 may be coupled to the receiver 15 for supplying negative polarity disabling pulses to the receiver each time the transmitter develops a radio-frequency pulse for application to the antenna system 16.

The tracking system 14 includes a circuit for generating tracking pulses. This circuit comprises a tracking gate generator 17 which is responsive to applied pulses of negative polarity for generating positive-polarity tracking pulses of substantially constant duration. The tracking system 14 also comprises a potential-responsive device 18 for sweeping the tracking pulses over a range of times relative to the time-reference pulses developed by the transmitter 11 and radiated by the antenna system 16. The potential-responsive device 18 includes a generator of pulses of variable and controllable duration in the form of a univibrator such as a synchronized sweep generator 19 of the phantastron type. Such a generator includes a pentode 20 which is capable of developing a sweep voltage of controllable duration at its anode and simultaneously developing a rectangular pulse of controllable duration at its screen electrode when it is triggered by the application of a negative-polarity control pulse supplied by the terminals 13, 13 through a coupling condenser 21 to the anode of the tube and from the anode through a condenser 26 to the control electrode thereof.

The anode of the tube 20 is connected to a source of positive potential indicated +B through a load resistor 23 and is connected to ground through a resistor 24. The cathode of the tube 20 is connected directly to ground and the control electrode is connected to the source +B through a resistor 25. The values of the resistor 25 and the condenser 26 determine the slope of the trace portion of the sweep wave generated by the generator 19 while the values of the resistor 23 and the condenser 26 primarily determine the recovery time of the generator. The screen electrode of the tube 20 is connected to the source +B through a resistor 27 and is also coupled to the suppressor electrode through a condenser 28. A source of negative potential indicated as —C is connected to the suppressor electrode of the tube through series-connected resistors 29, 30 and the junction of these resistors is coupled to the screen electrode through a condenser 31. The resistor 30 and the condenser 31 serve to couple the wave developed at the screen electrode to the suppressor electrode while the condenser 28 and the resistor 30 comprise a differentiating circuit for translating a differentiated signal from the screen electrode to the suppressor electrode. The screen electrode of the tube 20 is coupled to the input circuit of the tracking gate generator 17 through a differentiating circuit 32 of conventional construction.

The potential-responsive device 18 also includes a direct-current amplifier 34 and a clamping device in the form of a unidirectionally conductive device, such as a diode 35, which is coupled between the generator 19 and the amplifier 34 for controlling the duration of the output signal of the generator 19. As will be made clear hereinafter, the generator 19, the diode 35, and the amplifier 34 may be considered to constitute a searching and tracking device which is responsive to a predetermined constant potential applied to unit 34 for effecting tracking and is responsive to a varying potential for effecting searching by the distance-measuring equipment. The cathode of the diode 35 is connected to the anode of the tube 20 while the anode of the diode is connected to the anode of a pentode amplifier tube 36 of the unit 34. The anode of the tube 36 is connected to a source of potential +B through a load resistor 37, the screen electrode thereof is coupled to a source of potential +Sc through a voltage-dropping resistor 38, and the cathode and the suppressor electrode are connected to ground. The control electrode of the tube 36 is adapted selectively to be connected to a source of negative potential —C having a suitable value such as about —6 volts through a switch 40 and a resistor 41. The anode of the tube 36 is also coupled to ground through a relatively large energy-storage condenser 42 and is also coupled to the control electrode through a condenser 43. The arrangement of the amplifier 34 is such that feedback exists between the anode and the control electrode of the tube 36 and, as the conductivity of the tube increases, the apparent increase in the capacitance of the condenser 43 due to the amplification factor of the tube causes the control electrode-cathode capacitance of the tube to appear as a relatively large capacitance which is represented in broken-line construction as a condenser 39. As will be made clear hereinafter, the amplifier 34, under certain operating conditions, serves as a sweep oscillator for controlling the duration of two signals developed by the generator 19.

The tracking system 14 also includes means responsive to the potential at the anode of the tube 36 for indicating the position of the tracking pulses within the range of times those pulses may occur in relation to the transmitted time-reference pulses developed by the transmitter 11. The means just mentioned comprises a voltmeter 45 calibrated in distance and coupled between the anode of the tube 36 and ground through a current-limiting resistor 46.

The tracking system 14 further includes a first gated circuit responsive jointly to the tracking pulses and the received pulses for developing a first signal of substantially constant value or energy content and responsive jointly to the tracking pulses and the aforesaid first signal for developing a second signal of an energy content representative of the time relation between the tracking pulses and the received pulses. This circuit means comprises a first gated circuit or coincidence detector 47 in cascade with a wide pulse generator 48 for developing the first output signal and includes a second gated circuit or coincidence detector 49 for developing the second signal. The coincidence detector 47 is of conventional construction and may, for example, include an electron tube having a control electrode-cathode input circuit coupled to the output circuit of generator 17 through a pair of terminals 50, 50 and may also include a suppressor electrode-cathode circuit coupled to a pair of input terminals 62, 62 which, in turn, are coupled to the output circuit of the receiver 15. The wide pulse generator 48 may be a suitable unit such as a multivibrator which is responsive to the leading edges of the output pulses from unit 47 for developing a first signal comprising pulses of constant amplitude and duration and, hence, a substantially constant energy content, which duration is greater than that of the tracking pulses from the unit 17 and the short duration received pulses from receiver 15. Generator 48 preferably includes a suitable adjustable control 83 for selectively adjusting the duration of the output pulses supplied to the output terminals 51, 51 in accordance with the spacing of paired pulses received from a selected responder beacon. The coincidence detector 49 may be similar in construction to the detector 47. The output circuit of the tracking generator 17 is also coupled to a first input circuit of the detector 49 while the output terminals 51, 51 of the generator 48 are connected to another input circuit of unit 49 to develop at the output terminals 52, 52 thereof a second signal comprising pulses of constant amplitude and durations which may vary depending upon the time relation of the tracking pulses and the received pulses, as will be explained subsequently.

The tracking system 14 additionally includes a comparison circuit differentially responsive to the first pulse signal from the generator 48 and to the second pulse signal from the coincidence detector 49 for deriving and applying to the potential-responsive device 18 a potential varying with the energy content of the second pulse signal from the coincidence detector 49. This circuit includes a pair of oppositely poled unidirectionally conductive devices such as diodes 53 and 54, the cathode of the diode 53 being connected to the ungrounded output terminal 52 of the detector 49 through a coupling condenser 55 and its anode being connected directly to the cathode of the diode 54 and to the control electrode of the direct-current amplifier tube 36. The anode of the diode 54 is coupled to the ungrounded output terminal 51 of the generator 48 through a condenser 56 and is connected to a source of substantially constant bias potential —C having a suitable value such as —8 volts through resistors 57, 58, and 59. The three resistors and the condenser just mentioned are proportioned to constitute a differentiating circuit for the pulses supplied by the wide pulse generator 48. A suitable bias derived from the adjustable tap of a voltage divider 60 is applied to the cathode of the diode 53 through a resistor 61. For convenience in understanding the operation of the tracking system, the diodes 53 and 54 will be referred to hereinafter as "track-in" and "track-out" diodes, respectively.

The output terminals 51, 51 of the wide pulse generator 48 are connected to a differentiating circuit and amplifier 63 which is effective to derive in its output circuit positive-polarity pulses having leading edges occurring in time coincidence with the trailing edges of the wide duration pulses from the unit 48. The output circuit of the unit 63 is connected to a first input circuit of a coincidence detector 64 which has a second input circuit coupled to the output circuit of the receiver 15. The coincidence detector 64 may be similar in construction to the units 47 and 49 so that it responds to an output signal from unit 63 which is coincident with a second pulse of paired pulses developed in the output circuit of the receiver 15. The units 47, 48, 63, and 64 effectively constitute a decoder which responds to received paired pulses from the receiver 15 having a predetermined spacing corresponding to the particular code of the paired pulses emitted by a selected responder beacon.

The distance-measuring equipment also includes a control system which is coupled between the coincidence detector 64 and the generator 19, which system includes the amplifier 34 and is fully described and claimed in the copending application of William Buehrle and Conrad Lanza, Serial No. 354,701, filed concurrently herewith, and entitled "Control System for Distance-Measuring Equipment." This control system includes a first circuit in the form of a cathode-follower repeater 65 effective to develop a first potential of an approximately constant value of, for example, 105 volts at the cathode of its electron tube 66 during a searching interval. The anode of the tube 66 is connected to a source of potential +B through a load resistor 77, the control electrode thereof is connected to the cathode through a resistor 67, and the cathode of the tube is returned to ground through a resistor 68, thus normally maintaining the tube in a conductive condition. The control system also includes a time-constant control circuit coupled to the control electrode-cathode circuit of the tube 66 for applying thereto a control signal effective to initiate a tracking interval and to vary the first potential developed at the cathode of the tube 66 in a predetermined manner from its initial value of 105 volts during a tracking interval. This time-constant circuit is coupled to the output circuit of the coincidence detector 64 through a coupling condenser 69 and includes a diode 70 having its cathode connected to the condenser 69 and to a source of potential +B" through a resistor 71. The anode of the diode is connected to the control electrode of the tube 66 and is also connected to ground through a condenser 72 which is connected in parallel with the series combination of a large resistor 73 and a condenser 74 having a much larger value of capacitance than that of the condenser 72. The source of potential +B" is adapted selectively to be connected to the junction of the resistor 73 and the condenser 74 through a switch 75 which is preferably ganged with the switch 40 in the control-electrode circuit of the tube 36. The time constant of the condenser 72 and the series-connected resistors 67 and 68 is such that these elements are effective to integrate or stretch the duration of negative polarity control pulses applied by the coincidence detector 64 to the cathode of the diode 70. The capacitance of the condenser 74 is many times that of the condenser 72 so that it is charged only by the application of a series of regularly recurring pulses supplied by the output circuit of the coincidence detector 64 as when the equipment is performing a tracking operation. The time constant of the resistor 73 and the condenser 74 is such that the condenser 74 can discharge appreciably only after a predetermined interval corresponding to the so-called "memory" period of the distance-measuring equipment wherein the latter may resume tracking in the absence of a few beacon replies caused, for example, by a momentary failure of the beacon.

The control system also includes a voltage-divider apparatus responsive to the first potential developed at the cathode of the tube 66 during the searching interval of the equipment for developing during that interval a second potential having a substantially constant value and responsive to the aforesaid variation in the first potential at the cathode of tube 66 during the tracking interval for developing a third potential during that tracking interval and for substantially instantaneously developing the aforesaid second potential at the end of the tracking interval. This apparatus includes a gaseous-discharge device or glow tube 76 having one electrode connected to the cathode of the tube 66 and the other electrode thereof connected to the junction of the resistors 58 and 59. This voltage-divider apparatus further includes the source —C, the resistors 58, 59, and a unidirectionally conductive device or diode 85 which serves as a clamping device and has its anode connected to the junction of the resistors 57, 58 and its cathode connected to a source of potential +B' which may be of the order of 6 volts. The second and third potentials mentioned above are those developed at point Z comprising the junction of the resistors 57 and 58 during the searching and tracking intervals, respectively, of the distance-measuring equipment.

*Explanation of searching operation of distance-measuring equipment of Fig. 1*

In considering the operation of the distance-measuring equipment including the tracking system, it will be assumed initially that the switches 40 and 75 have been closed momentarily and then opened so as to place a negative charge across the condenser 39 in the control electrode-cathode circuit of the tube 36 and to charge positively the condenser 72 in the control electrode-cathode circuit of the tube 66. The charging of the condenser 72 insures that the tube 66 is fully conductive and there is developed at the cathode thereof a positive potential sufficient to render the glow tube 76 conductive. The flow of current through the tube 76 and the resistor 59 develops a positive potential at points X and Z comprising the junction of the resistors 58 and 59 and the junction of the resistors 57 and 58, respectively. The moment the potential at the point Z exceeds that of the source +B' connected to the cathode of the diode 85, it is effective to render the latter conductive thus clamping the potential at the point Z to that of the source + B'. The substantially constant potential of the source +B' is greater than that on the control electrode of the tube 36 so that the trackout diode 54 is rendered conductive. Prior to the diode 54 becoming conductive, the anode potential thereof corresponded to that of the source —C which, in one embodiment of the invention, had a value of about —8 volts. With the tube 66 fully conductive, however, the cathode potential thereof is at a positive potential of about 105 volts and the point X is at a substantially constant potential of 6 volts in one embodiment of the invention. When the diode 54 is rendered conductive as explained above, the condenser 39 in the control electrode-cathode circuit of the tube 36 begins to charge slowly from its initial value —C toward a more positive level such as the zero level represented by Curve B of Fig. 2. For convenience it will be assumed that the charging of the condenser 39 begins at time $t_1$ as represented in Curve B.

Figure 2:
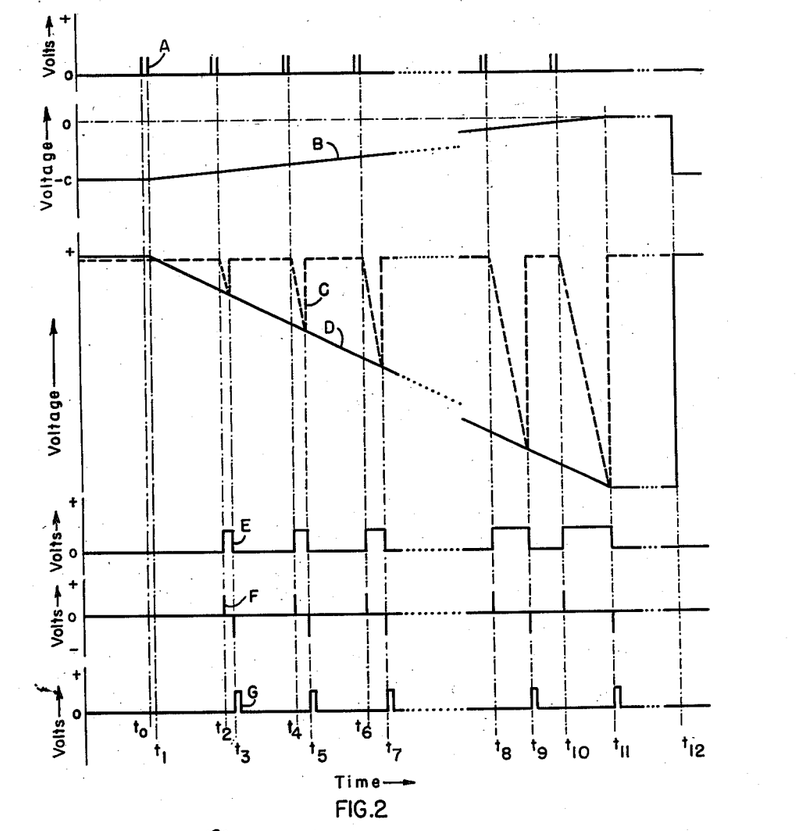
Figs. 2 and 3 are graphs utilized in explaining the operation of the locator and the tracking system of Fig. 1.

At time $t_0$ the timer 10 applies to the transmitter 11 a control pulse such as that represented by the first pulse of Curve A of Fig. 2. A predetermined interval later at time $t_1$, governed by the interrogating code of the particular distance-measuring equipment, the time-delay network 12 in response to the initial timing pulse applies a second pulse to the transmitter. Paired radio-frequency pulses which, like the pulses of Curve A constitute time-reference pulses, are developed by the transmitter and radiated by the antenna system 16. A pulse of negative polarity is developed at time $t_1$ in another output circuit of the delay network 12 simultaneously with the application thereby of the positive pulse to the transmitter 11, and the negative pulse is applied through the coupling condenser 21 and the condenser 26 to the anode and the control electrode, respectively, of the generator 19. At this instant the potential developed across the relatively large condenser 42 and, thus at the anode of the tube 36, is slightly higher than that of the tube 20 so that the diode 35 is conductive and thereby effective to ensure that the potentials of the tubes 36 and 20 are then substantially the same. The negative triggering pulse from the terminals 13, 13 is ineffective at time $t_1$ to alter the operating condition of the tube 20 since the anode of tube 20 is momentarily connected to a strong voltage source comprising the condenser 42. The condenser 39 in the control electrode-cathode circuit of the tube 36 continues to charge as represented by Curve B, so that as the control electrode of the tube 36 becomes more positive that tube becomes more conductive and causes the anode potential thereof to decrease in the manner represented by Curve D. Just prior to time $t_2$, the transmitter 11 is again triggered and at time $t_2$ another negative triggering pulse is applied to the control electrode of the tube 20. This pulse causes the potential of the screen electrode to increase, which increase is translated to the suppressor electrode by way of the coupling networks 30, 31 and 28, 30. This in turn permits the anode current to increase at time $t_2$ and causes a substantially linear decrease in the anode potential as represented by the broken line Curve C between the intervals $t_2$–$t_3$. At time $t_3$ the anode potential of tube 20 just begins to fall below that of the anode of the tube 36 and this renders the diode 35 conductive. Since the condenser 42 connected between the anode and the cathode of the tube 36 is relatively large and, therefore, has considerable energy stored therein, the potential of the anode of the tube 20 cannot fall below that of the anode of the tube 36. This is instrumental in causing the anode potential of the tube 20 suddenly to return to its original level at about time $t_3$, thus producing the retrace portion of the first sweep wave of Curve C. As the anode potential of the tube 20 was decreasing in the manner represented by Curve C during the interval $t_2$–$t_3$, the screen-electrode potential at the same time suddenly increased as represented by Curve E and then returned at time $t_3$ to its original value, thus producing a rectangular output pulse. It will be noted that the screen potential pulse has a duration corresponding substantially with that of the sweep potential developed at the anode of the tube 20.

The synchronizing pulses applied to the anode of the tube 20 at times $t_4$, $t_6$, $t_8$, etc. similarly develop negative-going sweep potentials at the anode of that tube and also develop positive-going rectangular pulses at the screen electrode of the tube. It will be observed that the magnitudes and the durations of the sweep potentials of Curve C during the successive intervals $t_4$–$t_5$, $t_6$–$t_7$, $t_8$–$t_9$, etc. are progressively greater and that the durations of the screen-electrode potential pulses represented by Curve E also become progressively greater. In each instance the magnitude of the sweep potential developed at the anode of the tube 20 is determined by the gradual decrease in the anode potential of the tube 36 under the control of the clamping diode 35. It will therefore be seen that the units 19 and 34, under the described conditions, constitute sweep generators wherein the unit 34 has a much lower sweep rate than that of unit 19. At a later time such as time $t_{11}$, the condenser 39 becomes charged from the source +B' to substantially a zero value which is the maximum value permitted by the parameters of the oscillator 34 and the anode potential of the tube 36 remains at a fixed level as represented by the horizontal line of Curve B between the interval $t_{11}$–$t_{12}$. The charging time constant of the condenser 39 is such that, in the absence of a signal received by the receiver 15, the condenser requires a predetermined interval of time such as 20 seconds for it to charge to the maximum value permitted by the circuit, namely from the potential of —8 volts to a zero potential level. This predetermined interval of time is represented in Fig. 2 as the period $t_1$–$t_{11}$ and, in one embodiment of the invention, has a duration of 20 seconds in the absence of any received pulses from the receiver 15. Thus, the trace portion of the wave of Curve D is chosen to have a duration which is considerably greater than the greatest expected round-trip propagation time between the distance-measuring equipment on the aircraft and a responder beacon interrogated. This round-trip propagation time is representative of a suitable distance such as 100 miles between the distance-measuring equipment and the responder beacon. At time $t_{12}$ the operator momentarily closes the ganged switches 40 and 75 and a negative charge corresponding to that of the source —C is placed across the condenser 39 and hence on the control electrode of the tube 36. The circuits of the amplifier 34 and the oscillator 19 are then conditioned to repeat the cycle of operation just described.

The output pulses of Curve E from the screen electrode of the tube 20 are applied to the differentiating circuit 32 which develops pulses of the type represented by Curve F of Fig. 2 for application to the input circuit of the tracking generator 17. The negative pulses of Curve F are derived from the trailing edges of the pulses of Curve E and since the last-mentioned pulses progressively increase in duration, the negative pulses effectively sweep over a range of times relative to the time-reference or second pulses of the paired pulses of Curve A. This range of times is related to the spacing between the second pulses of adjacent pairs of pulses of Curve A and may, for example, be a predetermined fraction of that spacing. The tracking-gate generator 17 develops the constant-amplitude and constant-duration output pulses represented in Curve G from the negative-going pulses of Curve F. Like the last-mentioned pulses, the tracking pulses of Curve G sweep over the range of times relative to the time-reference pulses occurring at times $t_2$, $t_4$, $t_6$, etc. It will be noted in Fig. 2 that the tracking pulses of Curve G occur at the ends of intervals $t_2$–$t_3$, $t_4$–$t_5$, $t_6$–$t_7$, etc., which represent progressively greater intervals. Accordingly, during the interval $t_1$–$t_{11}$, the tracking pulses effectively sweep over a range such as 100 miles in search for received reply pulses from a selected responder beacon for the purpose of conditioning the coincidence detector 47 to translate any reply pulses which are coincident with the recurrently generated tracking pulses. To simplify the representation and to promote a clearer understanding, Fig. 2 of the drawings illustrates only five tracking pulses during the sweep interval of the amplifier or oscillator 34. However, it will be understood that many such pulses occur during that sweep interval. In one embodiment of the invention, the interrogating rate of the transmitter 11 may be 15 per second so that 300 tracking pulses are developed during the sweep of the oscillator 34.

In the absence of any output pulses from the receiver 15, a signal is not applied to the coincidence detectors 47 and 64. Accordingly, output signals are not derived by those units. In the event a negative polarity output signal is not applied by the coincidence detector 64 through the diode 70 to the control electrode of the tube 66, the tube 66 is fully conductive and develops a potential at its cathode of sufficient value to render the glow tube 76 conductive and to supply from the point Z a substantially constant potential of about 6 volts for application through the track-out diode 54 to the control electrode of the tube 36 as previously stated. The distance-measuring equipment is then in its searching condition wherein it is capable of responding to reply pulses from a responder beacon. This search operation may continue as described above in connection with Fig. 2.

It will now be assumed that one or more pairs of coded reply signals have been received by the receiver 15 from an interrogator-responder beacon. When the first pulse of a coded pair of reply pulses is applied to the coincidence detector 47 simultaneously with the application of a tracking pulse from unit 17, that coincidence detector is rendered conductive and translates to its output circuit a relatively short-duration pulse for application to the wide-pulse generator 48. The generator 48 responds to the leading edge of the output pulse from the detector 47 and develops a wide pulse having a duration greater than that of the tracking pulse and the output pulse from unit 47 for application to the differentiating circuit and amplifier 63. Assuming that control 83 has been adjusted to provide output pulses of a duration corresponding to the spacing between a selected pair of coded reply pulses, an output pulse of generator 48 is differentiated and amplified and only a pulse corresponding to the trailing edge of the applied pulse is translated to an input circuit of the coincidence detector 64. The second pulse of a received pair of pulses from unit 15, when applied to the coincidence detector simultaneously with the application of a pulse from unit 63, is effective to render the detector conductive and develop in its output circuit a negative polarity pulse for application through the condenser 69 to the cathode of the diode 70. This renders the diode momentarily conductive and applies a negative polarity pulse of somewhat greater duration than the output pulse from detector 64 to the control electrode of the cathode follower 65 as a result of the integrating action of the condenser 72 and the resistors 67 and 68. The negative pulse applied to the control electrode of the cathode follower 65 renders it momentarily nonconductive and causes the cathode potential momentarily to drop to substantially zero, thus reducing the positive potential across the electrodes of the glow tube 76 so that it becomes nonconductive. As a result, a positive potential no longer appears at the anode of the clamping diode 85 and this tube becomes nonconductive. The source —C applies a negative potential through the resistors 59, 58, and 57 to the anode of the track-out diode 54, thus rendering the diode nonconductive and effectively leaving the control electrode of the sweep oscillator 34 floating at the potential appearing thereon at the moment the diode 54 became nonconductive since the condenser 39 lacks an effective discharge path. As a result, the anode potential of the tube 36 remains constant at a level such as that represented by Curve D of Fig. 3. The magnitude of the sweep voltage developed at the anode of the generator 19 is then determined by that voltage appearing at the anode of the tube 36. The application from the coincidence detector 64 to the cathode of the diode 70 of a series of output pulses of the type described will render the diode conductive and apply a negative charge through the resistor 73 to the relatively large condenser 74. The accumulation of a sufficiently negative charge across the condenser 74 is effective to maintain the cathode follower 65 in a nonconductive condition for a period having a duration related to the number of pulses in the series thereof applied to the diode 70. Under these conditions the distance-measuring equipment is conditioned to operate in its tracking condition and the tracking circuit 14 now performs its function.

*Explanation of operation of tracking system 14*

Figure 3:
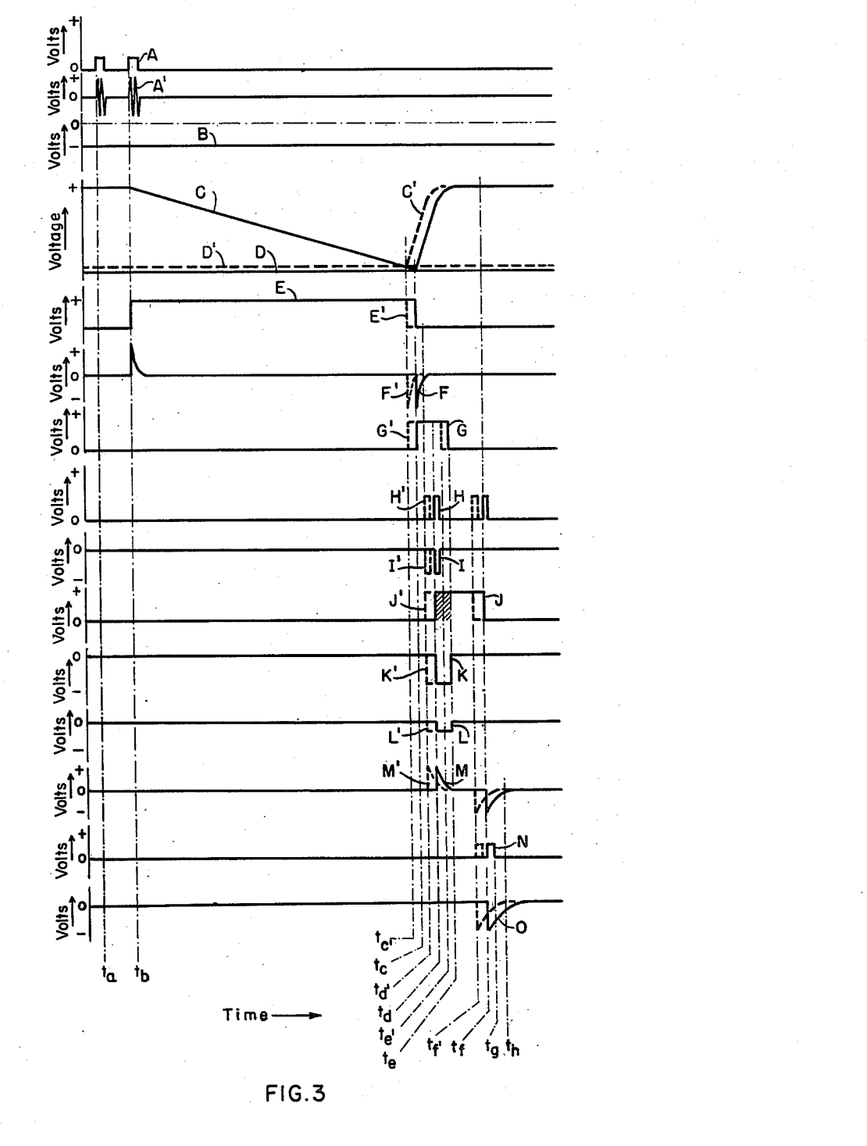

In considering the operation of the tracking system 14, reference is made to Fig. 3 of the drawings. Curves A and A′ represent, respectively, a pair of timing pulses from the timer 10 and a pair of transmitted interrogating pulses radiated by the antenna system associated with the transmitter 11. Curve B represents the potential appearing at the control electrode of the sweep generator 34 which is presently functioning as an amplifier. It will be assumed that this potential is somewhat less than the maximum value of zero volts to which the condenser 39 may charge. Full-line Curve C represents to a scale, which is considerably expanded horizontally but reduced vertically with relation to the scale of Curve C of Fig. 2, the sweep potential developed at the anode of the tube 20. The trace portion of this sweep potential is developed during the interval $t_b$–$t_c$ and the retrace portion occurs during the interval $t_c$–$t_e$. Curve C may be considered to represent a single sweep of the generator 19, for example, a sweep which will sensitize the coincidence detector 47 to receive signals from a responder beacon at a range of about 80 miles and this sweep may correspond to that represented during the interval $t_s$–$t_9$ of Curve C of Fig. 2. It will be clear that successive pairs of timing pulses following those represented by Curve A of Fig. 3 are capable of developing similar sweep potentials corresponding to Curve C. During the interval $t_a$–$t_f$, the potential of of the screen electrode of the tube 20 varies in a manner represented by full-line Curve E, becoming more positive during the interval $t_b$–$t_c$. The differentiating circuit 32 derives from the screen-electrode output signal of the tube 20 the signal represented by full-line Curve F of Fig. 3. The negative-going pulse occurring at time $t_c$ is effective to trigger the tracking-gate generator so that the latter develops the tracking pulse represented by full-line Curve G, which pulse has a constant amplitude and a duration occupying the interval $t_c$–$t_e$. It will now be assumed that the first received pulse represented in full-line Curve H is applied to the coincidence detector 47 at time $t_d$, which time corresponds exactly with the center of the tracking pulse of Curve G. The conjoint action of the first received pulse of Curve H and the tracking pulse of Curve G is effective to render the coincidence detector 47 conductive at time $t_d$, which corresponds with the leading edge of the received pulse, whereby the detector develops an output pulse represented by full-line Curve I. This output pulse is applied to the wide-pulse generator 48 which develops the wide pulse of full-line Curve J that occupies the interval $t_d$–$t_f$. This pulse has a substantially constant energy content and constitutes a first signal. The tracking pulse of Curve G from generator 17 and the wide pulse of Curve J from the generator 48 are applied to the two input circuits of the coincidence detector 49 and that unit develops the output pulse of full-line Curve K having a duration $t_d$–$t_e$ which corresponds to the interval during which the wide pulse of Curve J and the tracking pulse of Curve G are coextensive in time.

The wide pulse of Curve J from the generator 48 is differentiated by the condenser 56 and the resistors 57, 58, and 59 to develop the differentiated signal represented by full-line Curve M, which signal comprises a positive-going pulse having a duration $t_d$–$t_e$ and a negative-going pulse having a duration $t_f$–$t_h$. The positive-going pulse applied to the anode of the track-out diode 54 is effective to render it conductive. The potentiometer 60 is so adjusted that when the first received pulse of Curve H lies in the center of the tracking pulse of Curve G, the negative-going pulse translated by the track-in diode 53 has an amplitude such that the energy content of the translated pulse corresponds exactly with that of the positive-going pulse translated by the track-out diode 54. Such a pulse translated by diode 53 is represented by Curve L of Fig. 3 and constitutes a second signal having an energy content or duration which is representative of the time relation between the tracking pulses and the received pulses. Under this condition, the charge on the condenser 39 in the input circuit of the amplifier 34 remains unchanged. Consequently, the anode potential of the tube 36 remains at the level of Curve D of Fig. 3 and successive sweep waves (not shown) developed at the anode of the tube 20 as a result of the application of periodic synchronizing signals to the terminals 13, 13 of generator 19 have a lower limit determined by the anode potential of tube 36.

The wide pulse of Curve J developed by the generator 48 is also applied to the differentiating circuit and amplifier 63 which first develops the differentiated pulses which may also be represented by full-line Curve M and, by the well-known process of limiting and amplification, develops a positive output pulse occurring at time $t_f$–$t_g$ for application to an input circuit of the coincidence detector 64. The second of the received paired pulses is applied to the coincidence detector 64 at substantially time $t_f$ and with the pulse of Curve N renders the detector conductive to develop another negative potential pulse represented by Curve O for application to the control electrode of the cathode follower 65. This pulse momentarily charges the condenser 72 in a sense which will keep the glow tube 76 non-conductive for an interval of time and maintain the potential represented by Curve B on the control electrode of the tube 36.

It will now be assumed that a first received pulse of a pair of pulses from the responder beacon is not at the exact center of the tracking pulse of Curve G. Such a condition is represented by the broken-line pulse of Curve H' of Fig. 3, which pulse occurs at time $t_b'$. Such a condition may exist as when the aircraft is moving toward the responder beacon so that the distance therebetween decreases. The application of the pulse of Curve G and the broken-line pulse of Curve H' to the input circuits of the coincidence detector 47 results in a translation at time $t_d'$ of a pulse represented by broken-line Curve I'. The application of the pulse of Curve I' to the wide-pulse generator 48 results in the generation thereby during the interval $t_d'$–$t_f'$ of a broken-line wide pulse of Curve J'. It will be seen that this pulse has the same duration as the full-line pulse of Curve J but the pulse occurs somewhat sooner. The application of the pulses of Curves G and J' by units 17 and 48 to the coincidence detector 49 results in the generation of a negative output pulse represented by Curve K', which output pulse has a duration $t_d'$–$t_e$. The duration of this pulse corresponds to time during which the tracking pulse of full-line Curve G is coextensive in time with the wide gate pulse represented by Curve J'. The pulse of Curve K' has a duration which exceeds that of the pulse of Curve K by the time of advance of the pulse of Curve J' with reference to that of Curve J.

The pulse which is translated by the track-in diode 53 is represented by broken-line Curve L' and the positive-polarity pulse which is translated by the track-out diode 54 to the control electrode of the tube 36 is represented by broken-line curve M'. The duration of the last-mentioned pulse is the interval $t_d'$–$t_e'$ and its duration is, therefore, the same as the corresponding pulse of full-line Curve M somewhat shorter than that of the pulse of Curve L' occupying the interval $t_d'$–$t_e$. Accordingly, the energy content of the negative-going pulse applied by the track-in diode to the control electrode of the tube 36 is greater than that of the positive-going pulse applied thereto by the track-out diode 54. Accordingly, the condenser 39 in the control-electrode circuit of tube 36 is charged in a sense to permit the anode potential of the tube to increase to the level represented by the broken-line Curve D' of Fig. 3. During a latter sweep of the generator 19 (for convenience of representation being considered to commence at time $t_b$), the diode 35 becomes conductive at a level corresponding to that represented by Curve D' so that the anode potential of the tube 20 cannot fall below that level. The retrace portion of the aforesaid later sweep will then commence at the time $t_c'$ and is represented by the broken-line Curve C'. The later pulse developed at the screen electrode of the tube 20 will terminate at a time such as the time $t_c'$ as shown by broken-line Curve E', and an output pulse derived by unit 32 from the trailing edge of the pulse of Curve E' likewise occurs at time $t_c'$. The negative-going differentiated pulse occurring at time $t_c'$ triggers the tracking-gate generator 17 so that it develops an output pulse which may be represented by the broken-line Curve G', which pulse has a constant duration and a leading edge occurring at time $t_c'$. It will be seen from the representation of Curves G' and H' that the received pulse is now centered with reference to the new tracking pulse.

Should the received pulse be centered within the right-hand half of the full-line pulse of Curve G, the action of the tracking circuit is similar to that just described except that the negative pulse translated by the track-in diode is of smaller energy content that the positive pulse translated by the track-out diode 54. Under this condition, the charge applied to the condenser 39 is of a sense to cause the tracking gate pulse to track out, that is, to be displaced to the right of the position represented by Curve G so that the received pulse is centered on that tracking pulse. Thus, the tracking circuit 17 may be said to cause the developed tracking pulse to track the first pulse of the received paired pulses from the responder beacon.

The distance to the beacon which is being interrogated is directly related to the potential developed at the anode of the amplifier 34 and may be measured by the range calibrated voltmeter coupled between the anode and the cathode of the tube 36.

In the event the pilot desires to secure information as to his distance from another responder beacon which ordinarily responds to a different code, the adjustable control 86 of the delay network 12 is adjusted to provide a different time delay between paired pulses applied to the transmitter 11, thereby changing the interrogating code, and the adjustable control 83 is positioned to develop a wide pulse having a duration corresponding to the spacing of the paired reply pulses transmitted by that beacon in response to its interrogation. The gang switches 40 and 75 may be momentarily closed and the operation of the distance-measuring equipment begins to search in the manner previously described and, upon the reception of paired pulses having the new proper spacing, the tracking system 14 takes over and provides a distance indication on the meter 45 in the manner previously described.

Figure 4:
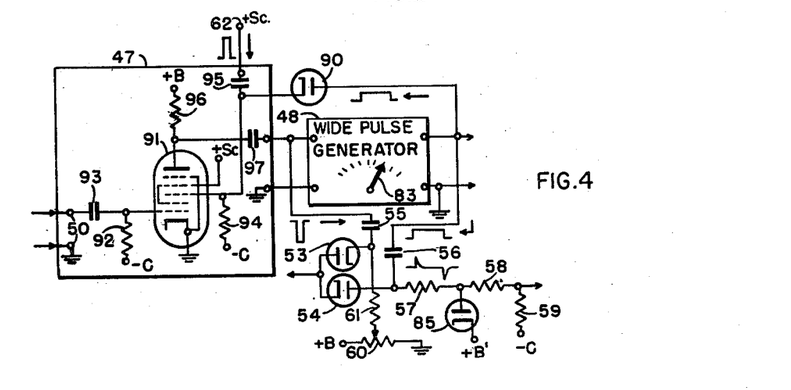
Fig. 4 is a schematic representation of a portion of a modified tracking system similar to that of Fig. 1

*Description of Fig. 4 modification of portion of tracking system and explanation of operation thereof*

Referring now to Fig. 4 of the drawings, there is represented a portion of a tracking system similar to that of Fig. 1, corresponding elements and units being designated by the same reference numerals. This modified portion permits the elimination of the separate coincidence detector 49 of Fig. 1 and accomplishes this by feeding back the wide output pulses from the generator 48 through an isolating diode 90 to the ungrounded input terminal 62 of the coincidence detector 47 to which the receiver 15 is connected. The diode 90 prevents positive-going signals from the terminal 62 from being applied to the output circuit of the generator 48 thus preventing undesired energy from being coupled into that circuit. For some applications this diode may be unnecessary. The coincidence detector 47 comprises a pentode 91, the inner control electrode of which is connected to the input terminals 50, 50 through a grid-leak and condenser network 92, 93, the resistor 92 being connected to a source of biasing potential —C. The suppressor electrode and the cathode are grounded while the two interconnected screen electrodes are also connected to a source of potential +Sc. The outer control electrode is connected to a biasing source —C through a resistor 94 and is also coupled to the ungrounded input terminal 62 through a coupling condenser 95. The anode of the tube 91 is connected to a source of potential +B through a resistor 96 and is also coupled to the input circuit of the generator 48 through a coupling condenser 97.

Figure 5:
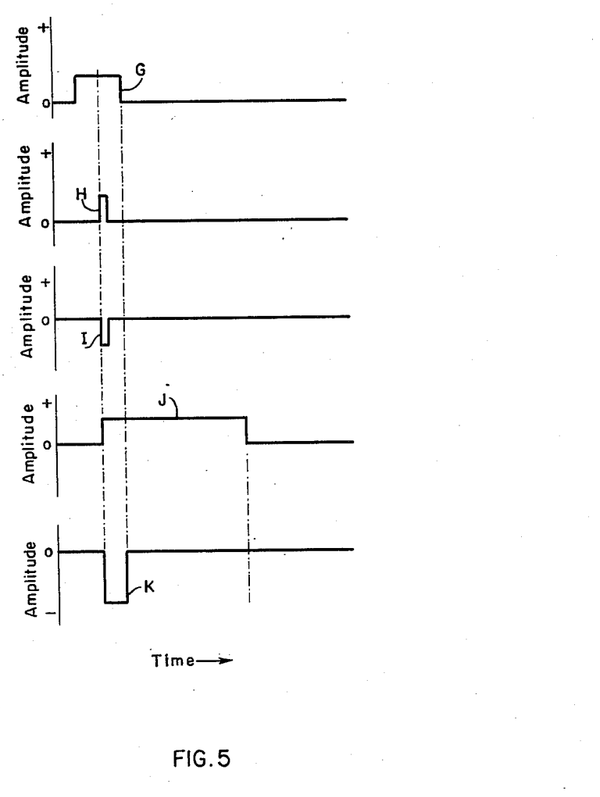
Fig. 5 is a graph useful in understanding the operation of the portion of the system of Fig. 4.

The operation of the coincidence detector 47 of Fig. 4 will be clear from the Curves of Fig. 5 wherein the various curves identifying the pulses applied to and developed by the various units have the same symbols employed in Fig. 3. The application of the received pulse of Curve H and the tracking pulse of Curve G of Fig. 5 to the inner and outer control electrodes, respectively, of the coincidence detector 47 develops in the anode-cathode output circuit thereof a pulse I which is applied to the wide-pulse generator 48. The latter develops a wide pulse J (a first signal of substantially constant energy content or duration) which is in turn applied through the diode 90 to the outer control electrode of the coincidence detector. As a result, there is developed in the output circuit of the detector 47 a negative-going output pulse (a second signal of an energy content or duration representative of the time relation between the tracking pulses of Curve G and the received pulses of Curve H) represented by Curve K, which pulse has a duration corresponding to the time the tracking pulse of Curve G is coextensive in time with the wide-gate pulse of Curve J. This pulse is applied to the track-out diode 54 for use in the manner previously explained in connection with the tracking circuit of Fig. 1 of the drawings.

While applicant does not wish to be limited to any particular circuit values for the embodiment of the invention described above, there follows a set of representative values which may be utilized in connection with the tracking system of Fig. 1 wherein the coincident detectors 47 and 49 are replaced by units 47 and 90 of Fig. 4.

Generator 19:
    Resistor 23______________ 100 kilohms.
    Resistor 24______________ 2.5 megohms.
    Resistor 25______________ 22 kilohms.
    Resistor 27______________ 33 kilohms.
    Resistors 29, 30_________ 1 megohm.
    Condenser 21____________ 15 micromicrofarads.
    Condenser 26____________ 1000 micromicrofarads.
    Condenser 28____________ 220 micromicrofarads.
    Condenser 31____________ 0.01 microfarad.
    Tube 20_________________ Type 5915.
    +B_______________________ 250 volts.
    —C_______________________ —15 volts.
    Trigger rate_____________ 15 pulses per second.
    Maximum sweep duration About 1250 microseconds.
    Maximum sweep voltage
      at anode of tube 20___ 175 volts.
    Screen-electrode pulse___ 45 volts.

Generator 34:
    Resistor 37______________ 100 kilohms.
    Resistor 38______________ 22 kilohms.
    Resistor 41______________ 68 kilohms.
    Condenser 39____________ About 10 microfarads.
    Condensers 42, 43________ 0.47 microfarad.
    +B_______________________ 250 volts.
    +Sc______________________ 100 volts.
    Sweep duration__________ About 20 seconds.
    Maximum sweep voltage
      variation_____________ About 200 volts.

Diodes 35, 90________________ Type ½ 6U8.
Track-in and track-out circuit
    Resistor 57______________ 2.7 megohms.
    Resistors 58, 61_________ 470 kilohms (max.)
    Resistor 59______________ 220 kilohms.
    Resistor 60______________ 500 kilohms (max.)
    Diodes 53, 54___________ Type ½ 6AL5.
    +B_______________________ 250 volts.
    —C_______________________ —8 volts.
    Condenser 55____________ 0.01 microfarad.
    Condenser 56____________ 470 micromicrofarads.

Coincidence detector 47:
    Resistors 92, 94_________ 470 kilohms.
    Resistor 96______________ 10 kilohms.
    Condensers 93, 95, 97____ 1000 micromicrofarads.
    +B_______________________ 250 volts.
    —C_______________________ —15 volts.

Duration of tracking pulse____ 10 microseconds.
Amplitude of tracking pulse___ About 15 volts.
Duration of wide pulse (as
    selected)_________________ 12–75 microseconds.
Voltage to track-in diode_____ About 100 volts.
    Duration of track-in pulse__ 0–10 microseconds.

From the foregoing descriptions of the various embodiments of the invention, it will be apparent that tracking systems in accordance with the present invention are relatively simple in construction, use a smaller number of electron tubes and other circuit components, and have relatively low power requirements. It will also be clear that a distance-measuring system in accordance with the present invention is adapted for use in a decoding apparatus of distance-measuring equipment which selects coded reply signals from interrogated responder beacons.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; and a circuit responsive to said first and second signals for deriving and applying to said device a potential varying with the energy content of said second signal.

2. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means responsive jointly to said tracking pulses and said received pulses for developing a first signal of substantially constant value and responsive jointly to said tracking pulses and said first signal for developing a second signal of a value representative of the time relation between said tracking pulses and said received pulses; and a circuit responsive to said first and second signals for deriving and applying to said device a potential varying with the value of said second signal.

3. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means responsive jointly to said tracking pulses and said received pulses for developing a first signal of substantially constant value and responsive jointly to said tracking pulses and said first signal for developing a second signal of a value representative of the time relation between said tracking pulses and said received pulses; and a circuit responsive to the difference between the values of said first and second signals for deriving and applying to said device a potential varying with the value of said second signal.

4. In a radio position locator including means for transmitting periodic time-reference pulses and receiving position-representative delayed pulses, a tracking system comprising: a circuit for generating tracking pulses; a potential-responsive device including a generator of pulses of variable duration responsive to at least some of the time-reference pulses for sweeping said tracking pulses in response to the trailing edges of said variable duration pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; and a circuit responsive to said first and second signals for deriving and applying to said device a potential varying with the energy content of said second signal.

5. In a radio position locator including means for transmitting periodic time-reference pulses and receiving position-representative delayed pulses, a tracking system comprising: a circuit for generating tracking pulses; a potential-responsive device including a synchronized generator responsive to predetermined ones of the time-reference pulses for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; and a circuit responsive to said first and second signals for deriving and applying to said device a potential varying with the energy content of said second signal.

6. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means including a first gated circuit responsive jointly to said tracking pulses and said received pulses for developing a first signal of substantially constant energy content and including a second gated circuit responsive jointly to said tracking pulses and said first signal for developing a second signal of an energy content representative of the time relation between said tracking pulses and said received pulses; and a circuit responsive to said first and second signals for deriving and applying to said device a potential varying with the energy content of said second signal.

7. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means including a gated circuit responsive jointly to said tracking pulses and said received pulses for developing a first signal of substantially constant energy content, and said gated circuit being responsive jointly to said tracking pulses and said first signal for developing a second signal of an energy content representative of the time relation between said tracking pulses and said received pulses; and a circuit responsive to said first and second signals for deriving and applying to said device a potential varying with the energy content of said second signal.

8. In a radio position locator including means for transmitting periodic time-reference pulses and receiving position-representative delayed pulses, a tracking system comprising: a circuit for generating tracking pulses of substantially constant duration; a potential-responsive device for sweeping said tracking pulses over a range of times relative to the time-reference pulses; circuit means including a pulse generator and responsive jointly to said tracking pulses and said received pulses for developing first pulses of substantially constant duration at least equal to that of said tracking pulses and responsive jointly to said tracking pulses and said first pulses for developing second pulses of durations which may vary and are representative of the time relation between said tracking pulses and said received pulses; and a circuit responsive to said first and second pulses for deriving and applying to said device a potential varying with the durations of said second pulses.

9. In a radio position locator including means for transmitting periodic time-reference pulses and receiving position-representative delayed pulses, a tracking system comprising: a circuit for generating tracking pulses.

of substantially constant duration; a potential-responsive device for sweeping said tracking pulses over a range of times relative to the time-reference pulses; circuit means, including a gated circuit responsive jointly to said tracking pulses and said received pulses and including a pulse generator in cascade with said gated circuit for developing first pulses of a substantially constant duration greater than that of said track pulses, and responsive jointly to said tracking pulses and said first pulses for developing second pulses of durations which may vary and are representative of the time relation between said tracking pulses and said received pulses; and a circuit responsive to said first and second pulses for deriving and applying to said device a potential varying with the durations of said second pulses.

10. In a radio position locator including means for transmitting periodic time-reference pulses and receiving position-representative delayed pulses, a tracking system comprising: a circuit for generating tracking pulses of substantially constant duration; a potential-responsive device for sweeping said tracking pulses over a range of times relative to the time-reference pulses; circuit means including a first gated circuit responsive jointly to said tracking pulses and said received pulses and including a pulse generator in cascade with said gated circuit for developing first pulses of a substantially constant duration greater than that of said tracking pulses, and including a second gated circuit responsive jointly to said tracking pulses and said first pulses for developing second pulses of durations which may vary and are representative of the time relation between said tracking pulses and said received pulses; and a circuit responsive to said first and second pulses for deriving and applying to said device a potential varying with the durations of said second pulses.

11. In a radio position locator including means for transmitting periodic time-reference pulses and receiving position-representative delayed pulses, a tracking system comprising: a circuit for generating tracking pulses of substantially constant duration; a potential-responsive device for sweeping said tracking pulses over a range of times relative to the time-reference pulses; a coincidence detector having a tracking-pulse input circuit, a received-pulse input circuit, and an output circuit for deriving output pulses upon coincidence of said received pulses and said racking pulses; a pulse generator having an input circuit coupled to said output circuit and having a pulse output circuit for developing therein from said output pulses, first pulses of substantially constant duration greater than that of said tracking pulses and at least partially coincident therewith; a feed-back circuit coupled between said pulse output circuit and said received-pulse input circuit for applying thereto said first pulses to render said coincidence detector responsive jointly to said tracking pulses and said first pulses and develop second pulses of durations which may vary and are representative of the time relation between said tracking pulses and said received pulses; and a circuit responsive to said first and second pulses for deriving and applying to said device a potential varying with the durations of said second pulses.

12. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means including a gated circuit responsive jointly to said tracking pulses and said received pulses for developing a first signal of substantially constant energy content and including a feed-back circuit for applying said first signal to said gated circuit, said gated circuit being responsive jointly to said tracking pulses and said first signal for developing a second signal of an energy content representative of the time relation between said tracking pulses and said received pulses; and a circuit responsive to said first and second signals for deriving and applying to said device a potential varying with the energy content of said second signal.

13. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; a circuit responsive to said first and second signals for deriving and applying to said device a potential varying with the energy content of said second signal; and means responsive to a potential of said device for indicating the position of said tracking pulses within said range of times.

14. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; a circuit responsive to said first and second signals for deriving and applying to said device a potential varying with the energy content of said second signal; means responsive to a potential of said device for indicating the position of said tracking pulses within said range of times; and disabling means coupled to said device for supplying a potential thereto to interrupt said sweeping of said tracking pulses.

15. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; and an energy-comparison circuit differentially responsive to said first and second signals for deriving and applying to said device a potential varying with the energy content of said second signal.

16. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means including a first portion responsive jointly to said tracking pulses and said received pulses for developing a first signal of substantially constant energy content and including a second portion responsive jointly to said tracking pulses and said first signal for developing a second signal of a polarity opposite that of said first signal and of an energy content representative of the time relation between said tracking pulses and said received pulses; and an energy-comparison circuit including a pair of oppositely poled unidirectionally conductive devices individualy coupled to said potential-responsive device and to said first and second portions and differentially responsive to said first and second signals for deriving and applying to said device a potential varying with the energy content of said second signal.

17. In a radio position locator including means for transmitting periodic time-reference pulses and receiving position-representative delayed pulses, a tracking system comprising: a circuit for generating tracking pulses; a potential-responsive device for sweeping said tracking pulses over a range of times relative to the time-reference pulses; circuit means including a first portion responsive jointly to said tracking pulses and said received pulses for developing a first signal of substantially constant energy content and including a second portion responsive jointly to said tracking pulses and said first signal for developing a second signal of a polarity opposite that of said first signal and of an energy content representative of the time relation between said tracking pulses and said received pulses; and an energy-comparison circuit, including a first unidirectionally conductive device and a biasing means therefor coupled between said potential-responsive device and said second portion and including differentiating means and a second unidirectionally conductive device oppositely poled with respect to said first device and coupled between said potential-responsive device and said second portion, differentially responsive to said first and second signals for deriving and applying to said device a potential varying with the energy content of said second signal.

18. In a radio position locator including means for transmitting periodic time-reference pulses and receiving position-representative delayed pulses, a tracking system comprising: a circuit for generating tracking pulses; a potential-responsive device, including a generator for developing a sweep potential and a potential-clamping system for controlling the magnitude of said sweep potential, for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; and a circuit responsive to said first and second signals for deriving and applying to said clamping system a potential varying with the energy content of said second signal.

19. In a radio position locator including means for transmitting periodic time-reference pulses and receiving position-representative delayed pulses, a tracking system comprising: a circuit for generating tracking pulses; a potential-responsive device, including a synchronized generator and a sweep generator coupled to said synchronized generator and effective to control the duration of the output signal of said synchronized generator, for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; and a circuit responsive to said first and second signals for deriving and applying to said sweep generator a potential varying with the energy content of said second signal.

20. In a radio position locator including means for transmitting periodic time-reference pulses and receiving position-representative delayed pulses, a tracking system comprising: a circuit for generating tracking pulses; a potential-responsive device, including a sweep generator having a signal-output circuit coupled to said tracking-pulse-generating circuit, a direct-current amplifier, and a clamping device coupled between said generator and said amplifier and effective with said amplifier to control the duration of the output signal of said generator, for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; and a circuit responsive to said first and second signals for deriving and applying to said amplifier a potential varying with the energy content of said second signal.

21. In a radio position locator including means for transmitting periodic time-reference pulses and receiving position-representative delayed pulses, a tracking system comprising: a circuit for generating tracking pulses; a potential-responsive device, including a first sweep generator and a second sweep generator coupled to said first generator and having a sweep rate much less than that of said first generator and effective to control the duration of the sweep thereof, for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; and a circuit responsive to said first and second signals for deriving and applying to said second generator a potential varying with the energy content of said second signal.

22. In a radio position locator including means for transmitting periodic time-reference pulses and receiving position-representative delayed pulses, a tracking system comprising: a circuit for generating tracking pulses; a potential-responsive device, including a sweep generator and a direct-current amplifier having an energy-storage input circuit and having an output circuit coupled to said generator and effective to control the duration of the sweep voltage thereof, for sweeping said tracking pulses over a range of times relative to the time-reference pulses; circuit means responsive jointly to said tracking pulses and said received pulses for developing a first signal of substantially constant energy content and responsive jointly to said tracking pulses and said first signal for developing a second signal of an energy content representative of the time relation between said tracking pulses and said received pulses; and a circuit responsive to said first and second signals for deriving and applying to said input circuit a potential varying with the energy content of said second signal.

References Cited in the file of this patent

UNITED STATES PATENTS

| | | |
|---|---|---|
| 2,491,029 | Brunn | Dec. 13, 1949 |
| 2,516,356 | Tull | July 25, 1950 |
| 2,538,027 | Mozley | Jan. 16, 1951 |
| 2,671,895 | Perkins | Mar. 9, 1954 |